US011273988B1

(12) United States Patent
Levadnyi et al.

(10) Patent No.: US 11,273,988 B1
(45) Date of Patent: Mar. 15, 2022

(54) BEARING HOUSING AND BEARING PROTECTION FOR CONVEYOR PULLEY

(71) Applicants: Ihor Levadnyi, Zhytomyr (UA); Vitalii Levadnyi, West Hollywood, CA (US)

(72) Inventors: Ihor Levadnyi, Zhytomyr (UA); Vitalii Levadnyi, West Hollywood, CA (US)

( * ) Notice: Subject to any disclaimer, the term of this patent is extended or adjusted under 35 U.S.C. 154(b) by 0 days.

(21) Appl. No.: 17/170,737

(22) Filed: Feb. 8, 2021

Related U.S. Application Data

(60) Continuation-in-part of application No. 16/816,712, filed on Mar. 12, 2020, now Pat. No. 10,858,195, which is a division of application No. 16/787,000, filed on Feb. 10, 2020, now Pat. No. 10,954,071, which is a continuation of application No. 16/010,504, filed on Jun. 17, 2018, now Pat. No. 10,604,348.

(51) Int. Cl.
*F16C 13/02* (2006.01)
*B65G 23/06* (2006.01)

(52) U.S. Cl.
CPC .............. *B65G 23/06* (2013.01); *F16C 13/02* (2013.01); *F16C 2326/58* (2013.01)

(58) Field of Classification Search
CPC ........ F16C 13/00; F16C 13/006; F16C 13/02; F16C 17/02; F16C 33/104; F16C 33/7816; F16C 33/7886; F16C 35/02; F16C 35/067; F16C 35/077; F16C 2226/12; F16C 2226/76; F16C 2326/58; F16C 2361/63; B65G 23/06; B65G 39/09
See application file for complete search history.

(56) References Cited

U.S. PATENT DOCUMENTS

| | | | | |
|---|---|---|---|---|
| 4,315,566 A | * | 2/1982 | Greener | B65G 39/09 193/37 |
| 4,339,158 A | * | 7/1982 | Greener | B65G 39/09 193/37 |
| 4,458,957 A | * | 7/1984 | Greener | B65G 39/09 277/420 |

FOREIGN PATENT DOCUMENTS

| | | | | |
|---|---|---|---|---|
| GB | 620913 A | * | 3/1949 | B65G 39/09 |
| GB | 1147911 A | * | 4/1969 | B65G 39/09 |

* cited by examiner

*Primary Examiner* — Phillip A Johnson
(74) *Attorney, Agent, or Firm* — Vadim Polonichko (57) ABSTRACT

A bearing housing with improved protective element and non-separable conveyor pulley that reduces metal use, labor, assembly and maintenance costs. The conveyor pulley includes a tubular housing, an axle, two bearing housings with an integrated bearing protection and two bearings. Bearing protector includes air permeable element (e.g., wool, felt) that is configured to allow passage of air while preventing dust and other particulars from entering the bearing thereby improving bearing operation and longevity. The proposed configuration provides protection for pulley bearings from dust and abrasive particles. The bearing housing assembly is manufactured using polymer composite materials by injection molding with embedded parts. The bearing housing includes a slanted bevel proximate outer side of the housing facet to facilitate installation into the pulley housing. The conveyor pulley housing tube is form-pressed around the slanted face to form non-separable conveyor pulley.

20 Claims, 6 Drawing Sheets

BEARING HOUSING AND BEARING PROTECTION FOR CONVEYOR PULLEY

RELATED APPLICATIONS

This application is a continuation-in-part of and claims the benefit of priority to co-owned U.S. patent application Ser. No. 16/816,712 filed Mar. 12, 2020 and entitled "CONVEYOR PULLEY APPARATUS AND METHODS", now U.S. Pat. No. 10,858,195, which is a divisional of and claims priority to pending U.S. patent application Ser. No. 16/787,000 filed Feb. 10, 2020 and entitled "BEARING AND BEARING PROTECTOR APPARATUS AND METHODS", which is a continuation of and claims priority to U.S. patent application Ser. No. 16/010,504 filed Jun. 17, 2018 and entitled "CONVEYOR PULLEY BEARING, AND BEARING PROTECTOR APPARATUS AND METHODS", now U.S. Pat. No. 10,604,348, each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE DISCLOSURE

Field of the Disclosure

The present disclosure relates generally to the field of engineering, improvement of bearings that operate in the challenging environment where the dust content is increased or heavy (ore mining, metallurgy, coal-mining industry, agriculture, building industry, airspace, geophysical exploration (e.g., oil and gas), and more particularly in one exemplary aspect to conveyor pulley apparatus, pulley bearings, bearing seal components and methods for manufacturing thereof.

Description of Related Art

The disclosure relates to the field of engineering, improvement of pulleys for belt conveyers that operate in the challenging environment where the dust content is increased or heavy (ore mining, metallurgy, coal-mining industry, agriculture, building industry, and/or other applications). When operating conveyors in dusty environments, dust and/or particular matter may enter the bearing and damage/and or destroy the pulley.

It is well known that more than 90% of rolling element bearings (also referred to as rolling bearings) used in the world industry do not reach the base design life set by the manufacturer.

Numerous studies have shown that the main problem with bearing failure is lubricant contamination. The largest amount of contamination enters the bearing housing through the shaft exit points. During operation, the equipment is subject to numerous temperature fluctuations, atmospheric pressure drops. To equalize the pressure inside the housing with the ambient atmospheric pressure, air is constantly moved. As a result of these processes, dust particles less than 1 micron get into the bearing lubrication.

Typical labyrinth seals used do not protect the bearings from fine dust particles, as a result of which contaminants enter the housing and lubrication of the bearings, which seriously reduces their service life and leads to equipment failure. Numerous studies have shown that the main problem with bearing failure is lubricant contamination. The largest amount of contamination enters the bearing housing through the shaft exit points and housing ventilation.

Some existing configuration of protection of the bearing assembly from dust and abrasive include use of labyrinth seals, protection covers of various types, installation of additional lip seals and gaskets, use of enclosed bearings. These are not always adequate as air flow due to thermal expansion and contraction during bearing operation may suck dust particles through a seal into the bearing. It may be desirable to provide for an improved bearing protection with greater level of sealing and protection from dust and/or particulate matter and extended service life.

SUMMARY OF THE DISCLOSURE

One aspect of the disclosure relates to a pulley assembly for use in a belt conveyor. In one implementation, the pulley assembly includes: a cylindrical housing, characterized by a first inner diameter and having a first end and a second end opposing the first end; an axle characterized by an axle diameter; a first bearing assembly disposed onto the axle proximate the first end; and a second bearing assembly disposed onto the axle proximate the second end.

In some implementations, individual ones of the first bearing assembly and the second bearing assembly include: a bearing housing characterized by an outer cylindrical surface and configured to receive a bearing, the bearing housing having a bevel disposed proximate an outward facing side and forming an angle with the outer cylindrical surface; and an air-permeable sealing element disposed proximate the outward facing side of the bearing housing; an air-permeable sealing element configured to allow air passage between the outward facing side and an inward facing side of the housing; the outer cylindrical surface is characterized by a first outer diameter configured no smaller than the first inner diameter so as to form a press fit between the pulley housing and individual ones of the bearing housing; and the pulley housing is configured to form a first and a second a slanted chamfers proximate the first end and the second end, respectively; individual one of the first and the second slanted chamfers matching the bevel of the bearing housing of the first and the second bearing assembly, respectively, individual ones of the slanted chamfers configured to retain the respective ones of the first and the second bearing assembly within the pulley housing.

In some implementations, the bearing housing includes: a plastic housing including a first cylindrical cavity proximate the bearing side, the first cylindrical cavity having a second inner diameter that is smaller than the first outer diameter; and a second cylindrical cavity formed proximate the distal side.

In one implementation the plastic housing includes an engineering plastic material selected from the list consisting of polyamide polymer, Nylon, ultra-high molecular weight polyethylene, polycarbonate, acrylonitrile butadiene styrene (ABS), and polyoxymethylene and the third inner diameter configured in the range between 95% and 97%, inclusive, of the axle diameter.

In some implementations, the air permeable element includes an air-permeable ring disposed inside the second cylindrical cavity, the air-permeable ring characterized by an third inner diameter configured no greater than the axle diameter.

In some implementations, the air-permeable ring includes one or more of felt, synthetic fiber reinforced felt, and wool; and the air-permeable material is impregnated with a lubricant configured to reduce friction between the axle and the air-permeable ring.

In one implementation, the pulley housing is characterized by a first thickness; and the first outer diameter configured no to exceed the first inner diameter by an amount configured between one half and one of the first thickness.

In some implementations, the first bearing assembly includes: a first bearing disposed coaxially within the first cylindrical cavity of the first bearing assembly bearing housing; and second bearing disposed coaxially within the first cylindrical cavity of the second bearing assembly bearing housing; individual ones of the bearing housing of the first and the second bearing assembly further include a shoulder portion disposed around the circumference of the respective first cylindrical cavity; the shoulder portion is configured to arrest axial insertion of respective one of the first bearing and the second bearing into the respective first inner cavity.

In on implementation, individual ones of the first bearing and the second bearing include a metal rolling bearing; and the first inner diameter is selected from the range between 72 mm and 152 mm, inclusive.

In another aspect of the disclosure a bearing housing with integrated bearing protection is disclosed. In some implementations, the bearing housing includes a cylindrical body characterized by a first outer diameter, a bearing side and a distal side, the cylindrical body having an outer cylindrical surface, the cylindrical body forming: a first cylindrical cavity proximate the bearing side, the first cylindrical cavity having a first inner diameter that is smaller than the first outer diameter; a second cylindrical cavity formed proximate the distal side, the second cylindrical cavity having a second inner diameter that is smaller than the first inner diameter; an air permeable ring disposed inside the second cylindrical cavity; and a bevel disposed proximate the distal side and forming an angle with the outer cylindrical surface; outer diameter of the an air permeable ring is configured equal the second inner diameter.

In some implementations, the air-permeable ring includes one or more of felt, synthetic fiber reinforced felt, and wool; the air-permeable ring is configured to prevent passage of solid particles with particle sizes between 1 micrometer and 100 micrometer inclusive from the distal side to the bearing side.

In one implementation, the air-permeable material is impregnated with a lubricant configured to reduce friction between the axle and the first bearing protector.

In some implementations, the cylindrical body includes one or more of polyamide polymer, Nylon, ultra-high molecular weight polyethylene, polycarbonate, acrylonitrile butadiene styrene (ABS), and polyoxymethylene.

In one implementation, the cylindrical body includes a shoulder portion disposed around the circumference of the first cylindrical cavity.

In some implementations the bearing is configured to be inserted axially into the first cylindrical cavity from the bearing side via a press-fit operation, the shoulder portion is configured to arrest axial insertion of the bearing into the first inner cavity; and outer diameter of the bearing is configured to match the first inner diameter to form a slide-in fit.

In some implementations the bearing includes a metal rolling-element bearing; and the air-permeable ring forms an opening with a third inner diameter; the second inner diameter is configured at least 95% of the axle diameter; and the angle is selected from the range between 30° and 60°, inclusive.

In a third aspect of the disclosure, methods of manufacturing the bearing housing with integrated bearing protector are disclosed. In one implementation, the bearing housing with the bearing protector is manufactured by placing a felt ring into a mold and use vertical and/or horizontal molding machines and/or injection molding machines to produce plastic casing.

In a fourth aspect of the disclosure, methods of manufacturing non separable conveyor pulley assemblies including bearing housing with integrated protection are disclosed.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

All Figures disclosed herein are © Copyright 2021. All rights reserved.

DETAILED DESCRIPTION

Implementations of the present technology will now be described in detail with reference to the drawings, which are provided as illustrative examples to enable those skilled in the art to practice the technology. Notably, the figures and examples below are not meant to limit the scope of the present disclosure to a single implementation or implementation, but other implementations and implementations are possible by way of interchange of or combination with some or all of the described or illustrated elements. Wherever convenient, the same reference numbers will be used throughout the drawings to refer to same or like parts.

The present disclosure relates generally to the field of engineering, improvement of pulleys for belt conveyers that operate in the challenging environment where the dust content is increased or heavy (ore mining, metallurgy, coal-mining industry, agriculture, oil and gas exploration, construction industry, and/or other applications) for the purpose of extension of the service life of bearings and pulleys.

One of the objectives of the present disclosure is development of a conveyer pulley with improved performance characteristics, reduction in metal consumption and labor efforts during manufacture, assembly and maintenance of the said conveyer pulleys. In order to achieve this objective, the technical problem is further to lower requirements for quality of processing of parts, to increase ease of their installation and replacement, to enhance strength and ultimately, to increase the service life of the pulleys. Furthermore, the relevant objective is developing of a universal pulley, which can be used without significant modifications in the conveyers that use both flexible and rigid frames.

FIGS. 1A-1E illustrate some implementations of a bearing housing assembly with integrated bearing protection element (also referred to as bearing protection assembly). The bearing housing assembly 100 of FIG. 1A may also be referred to as a pulley endcap and/or an end cap. The bearing housing of the present disclosure, for example, including that described with reference to FIG. 1A, may be used in pulley assemblies of various diameters with standard metal rolling bearings. In some implementations, the bearing housing assembly 100 of FIG. 1A may be used with non-separable conveyor pulleys, e.g. such as shown and described herein with respect to FIGS. 2A-2E.

The bearing protection assembly shown and described herein, may enable protection of assemblies of rolling bearings and/or friction bearings that operate in challenging environments with high or heavy dust content, such as ore mining, metallurgy, coal-mining, agriculture, construction, geophysical exploration, and/or other applications. Use of improved sealing elements and protective means for bearing assemblies may reduce penetration of dust and/or other particular matter into bearings and/or pulley assemblies thereby extending operation lifetime of the bearings.

Figure 1A:
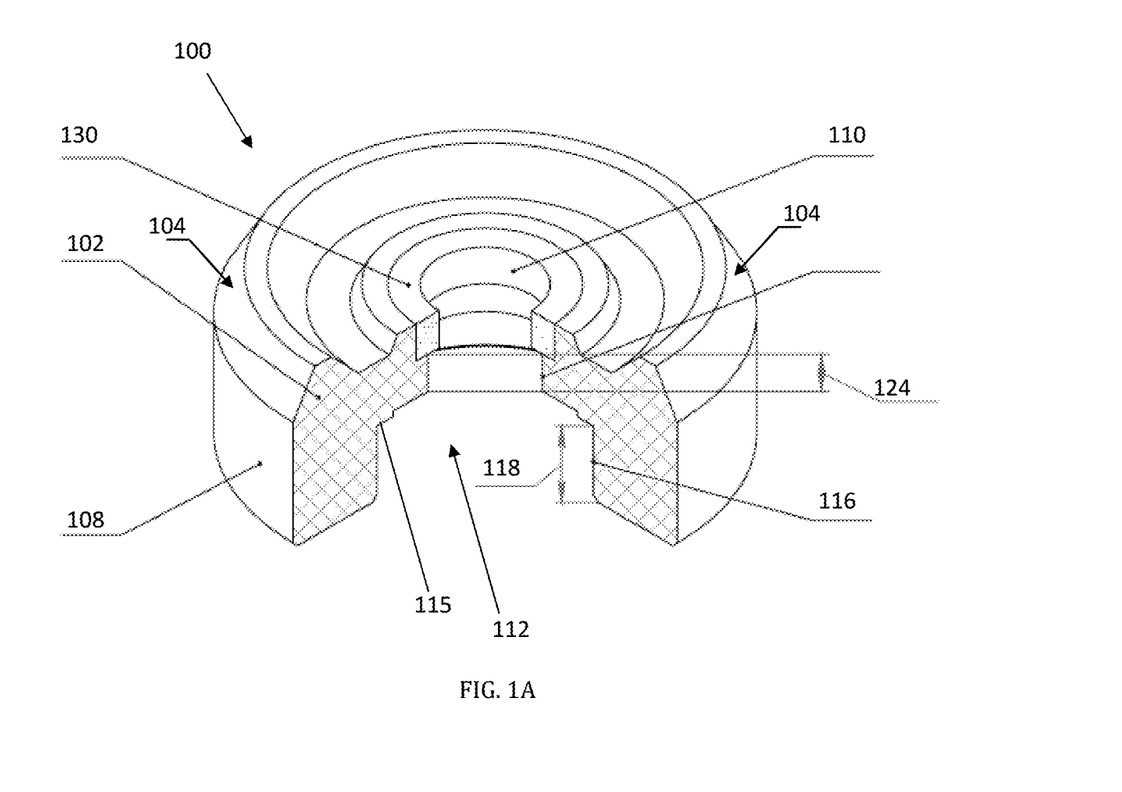
FIGS. 1A-1D illustrate some implementation of a bearing housing with integrated protection in accordance with one or more implementations.
Figure 1B:
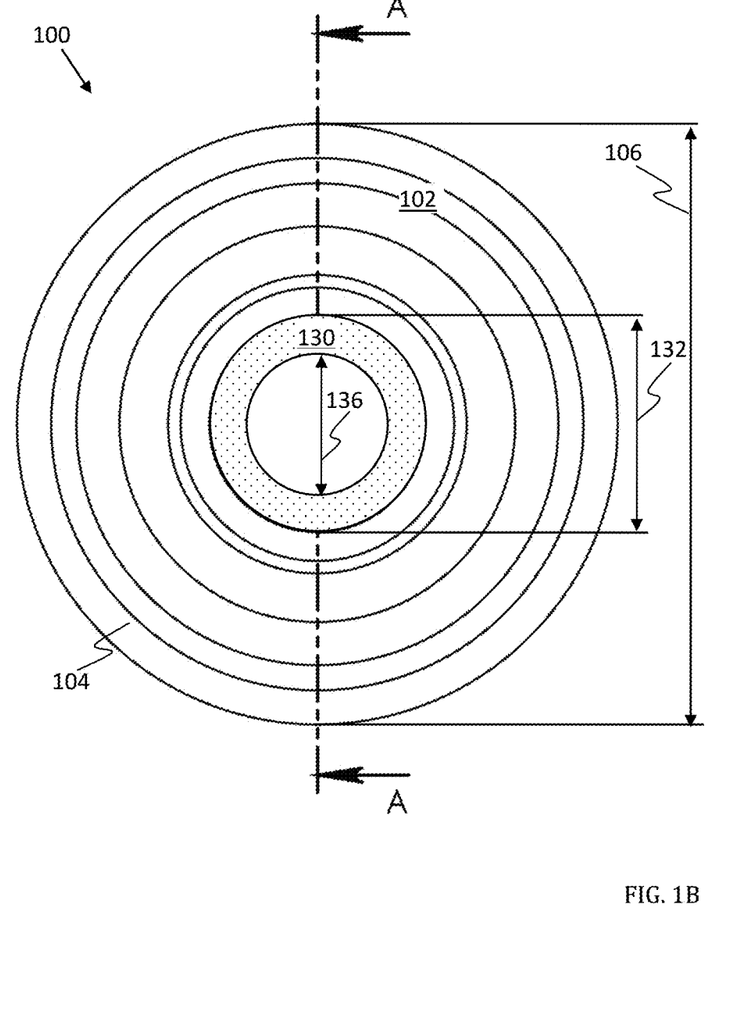
Figure 1C:
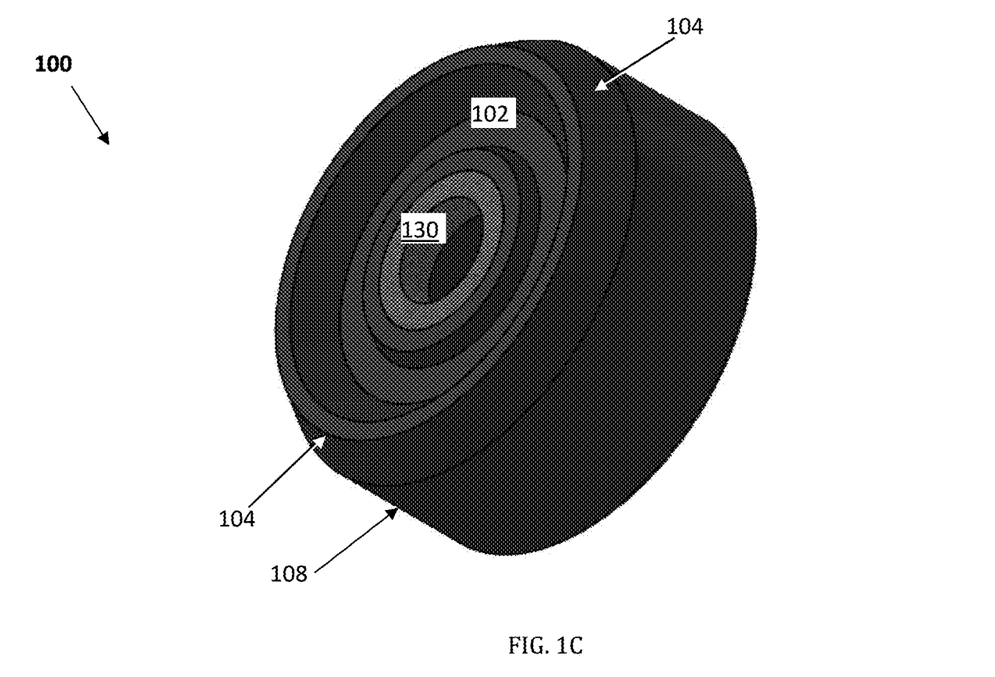
Figure 1D:
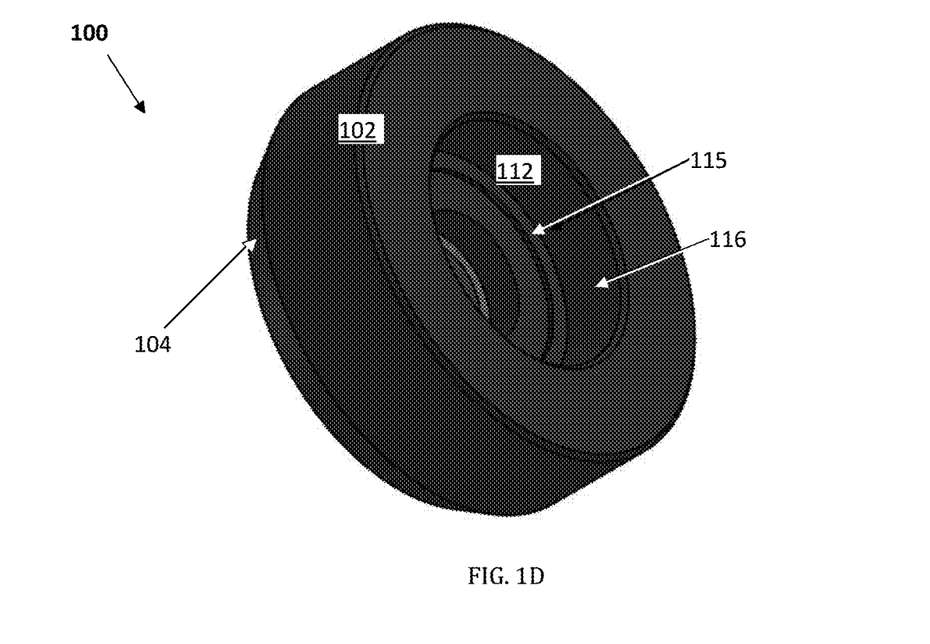

FIG. 1A is a perspective view of one implementation of a bearing housing assembly shown with a cut out. FIG. 1B presents a top plan view and a cross section of the bearing housing assembly of FIG. 1A. The bearing housing assembly may be used in a pulley of, e.g., a belt conveyor. One implementation of a non-separable pulley assembly is shown and described below with reference to FIGS. 2A-2E.

In some implementations, the bearing housing 100 comprises a solid portion 102 having an outer surface 108 characterized by a first outer diameter (106) and a hole characterized by a first inner diameter (114) serving as a bearing seat; and an air-permeable ring (130) having a second outer diameter (132) configured to be equal to the outer diameter of the felt ring, the ring being positioned inside the hole (112) so that the seal assembly is mounted on the bearing axis; and the air permeable ring is composed of an air permeable material configured to provide air passage between the distal side and the bearing facing side.

The bearing housing assembly 100 of FIGS. 1A-1B may include a plastic housing 102 and a sealing element 130 (also referred to as protective element). The housing 102 may form an inner cavity 112 formed by an inner wall 116. The cavity 112 may be characterized by the diameter (114 in FIG. 1B) and depth 118.

Dimensions of the bearing housing and/or sealing element may be configured in accordance with technical specification of a given application. These may include bearing dimensions (diameter and width), pulley shaft dimensions, pulley housing dimension, pulley load and/or other parameters.

The sealing element 130 may be configured as a ring manufactured from an air permeable material (e.g., felt) configured to prevent passage of particulate from outside the inside the bearing assembly. Inner diameter 136 of the sealing element 130 may be selected according to the dimensions of the pulley axle (shaft), e.g., an outer diameter of the axle 210 in FIG. 2A. To ensure full contact, inner diameter 136 of the sealing element 130 may be selected smaller than the shaft diameter, by e.g., 3% to 5%, inclusive, in some implementations. Such configuration may ensure an improved air seal between inner surface 110 of the sealing element 130 and the pulley axle. By way of an illustration, when used with a 20 mm axle diameter, the diameter 136 may be selected at 19 mm. In some implementations, outer diameter 132 of the sealing element 130 may be configured greater than internal diameter of the bearing inner race, e.g., greater than dimension 120 by 3 mm to 8 mm. In one implementation, outer diameter 132 may be selected from the range between about 30 mm to about 32 mm, inclusive. The thickness 134 of the sealing element 130 may be selected from the range between 7 mm and 10 mm, inclusive.

Figure 2A:
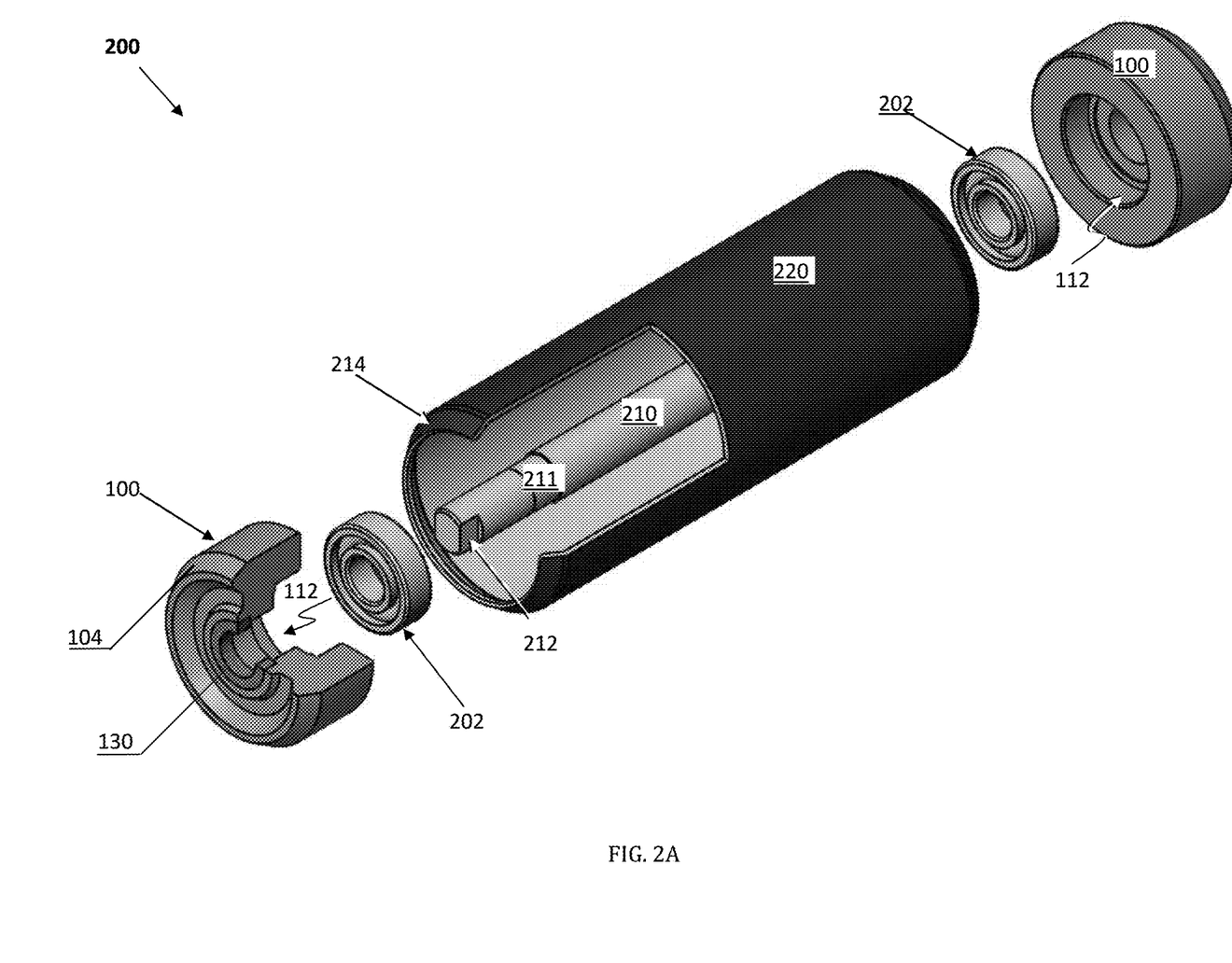
FIG. 2A is an exploded perspective view illustrating a non-reparable pulley assembly utilizing bearing housings with integrated protection (e.g., such as in FIG. 1C) and metal rolling-element bearings in accordance with some implementations of the disclosure.

Diameter 114 of the inner cavity 112 (also referred to as the bearing cavity) may be configured in accordance with dimensions (e.g., the outer diameter of the outer race) of a rolling bearing that the housing 102 is intended to be used with (e.g., bearing 202 in FIG. 2A). The inner cavity diameter may be selected according to the outer dimensions of the bearing. In order to provide a secure fit, the inner cavity 112 of the housing may be made with a slightly smaller diameter 114, relative to the outer diameter of the bearing (e.g., bearing 202 in FIGS. 2A-2D) in order to create a secure press fit. By way of an illustration, when used with a 6304 (304PP) bearing, which may be characterized by an outer diameter of 52 mm, the diameter 114 may be selected at 51.95 mm; when used with a radial bearing 6204 (204PP), which is characterized by an outer diameter of 47 mm, diameter 114 may be selected at 46.95 mm. Such diameter configuration may provide a secure fit of the housing 102 with the bearing (e.g. 202 in FIG. 2A). In some implementations, the bearing housing assembly of the present disclosure may be utilized with sleeve bearings. It is noteworthy that different bearing models may be characterized by different dimensions. By way of a non-limiting illustration, bearings dimensions may be as follows:

TABLE 1

| Bearing Model (DIN) | internal diameter (mm) | outside diameter (mm) | thickness/width (mm) |
| --- | --- | --- | --- |
| 6204 | 20 | 47 | 14 |
| 6304 | 20 | 52 | 15 |
| 62204 | 20 | 47 | 18 |
| 62304 | 20 | 52 | 21 |

The housing 102 may include a shoulder (115 in FIGS. 1A and 1D) disposed inside the cavity 112. Shoulder 115 may be used to arrest an extent of axial insertion of a bearing (e.g., 202 in FIG. 1A) into the inner cavity 112 of the housing 201.

Dimensions of the housing 102, sealing element 130 may be selected based on specifications for a given pulley. Different bearings may be employed in accordance with technical specifications of a given conveyor (e.g., speed, load, duration of uninterrupted operation, cost, maintenance schedule, amount of particulates in the air, and/or other parameters.

Depth 118 of the cavity 112 may be configured based on the width of the bearing (e.g., bearing 202 in FIG. 2A).

Thickness 122 of the bearing housing may be configured in accordance with the design parameters for a pulley, including pulley weight, cost, bearing dimensions, load, and/or other parameters. Thickness 122 may be configured based on the width of the bearing (118), thickness of the sealing element (134), dimension 124 that may be between 3 mm and 5 mm, inclusive, for a bearing housing configured for radial bearing 6204/204PP, and an additional thickness amount between 2 mm and 10 mm.

Internal diameter 120 of the bearing housing portion between the bearing cavity and the sealing element may be configured based on the inner diameter of the bearing (e.g., diameter of the bearing inner race) used with the bearing housing. In some implementations, diameter 120 may be configured between 4 mm to 5 mm greater than the bearing inner diameter.

Outer diameter 106 of the bearing housing assembly 100 may be selected to fit in the tubular pulley housing with proper press-fitting tension so that the bearing housing remains inside the pulley tubing without changing its position during continuous operation. As an illustration, for a pulley diameter of 70 mm, outer diameter 106 of the bearing housing assembly 100 may be selected to be 70.4 mm.

Outer diameter 106 and inner diameter 114 of the housing 102 may determine wall thickness of the bearing housing.

Figure 2B:
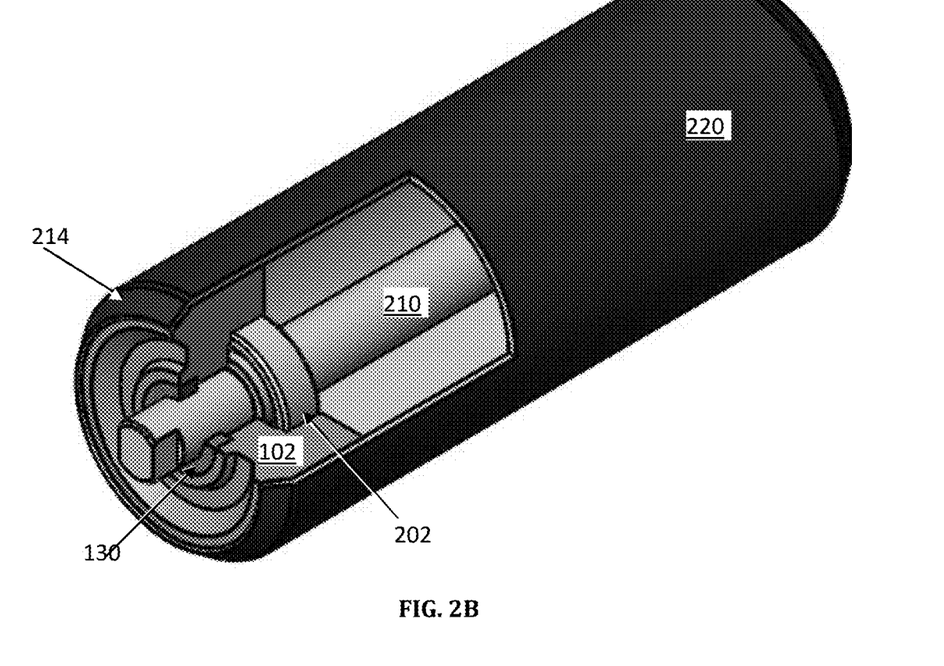
FIG. 2B is a perspective view illustrating an assembled pulley of FIG. 2A.

Outer surface of the bearing housing may include a bevel (slanted facet) 104 disposed proximate the outer side of the housing 102. As used herein, the term outer or external side of the bearing housing may be used to refer to the side housing 102 that is facing to the outside when installed in a pulley (e.g., as shown in FIG. 2B) and wherein the sealing element is disposed; the term inner, internal, or bearing-facing side, may be used to refer to the side housing 102 that contains the bearing cavity 112 configured to receive a bearing and is facing to the inside of the pulley when installed in a pulley (e.g., as shown in FIG. 2B). The bevel 104 may form an angle 128 with the side wall 108 of the housing. Angle 128 may be configured based on the diameter of a pulley housing and/or thickness of the pulley housing and may be selected from the range between 30° and 60°, inclusive. Slanted bevel 104 may be used during installation of the bearing housing assembly 100 into a pulley such as to provide arresting surface during press-fit operation as outer edges of the pulley housing are bent in and squeezed around its circumference during the press fit operation to obtain closed pulley configuration, such as shown in FIG. 2B.

Height 126 of the bevel 104 may be configured based on bearing width, diameter, housing diameter 106, diameter and/or thickness of the pulley housing. In some implementations, height 126 may be between 8 mm and 16 mm, inclusive, 10 mm in one implementation used with a 100 mm pulley diameter and radial bearing 6204 (204PP).

In some implementations, the bearing housing assembly may be used with radial or sleeve bearings in non-separable conveyor pulleys, e.g. such as described herein with respect to FIGS. 2A-2D. In this implementation, the bearing housing assembly 100 may comprise a solid portion 102 having an outer surface characterized by a first outer diameter 106 and an inner surface 112 characterized by a first inner diameter 114 and forming an opening configured to receive a bearing; and an air-permeable sealing element (ring 130); the solid portion having a second inner diameter configured to be equal to the outer diameter 132 of the ring, the felt ring being positioned inside a housing cavity so that the air permeable sealing element may be mounted coaxially with the bearing on an shaft of a pulley; where the air permeable sealing element may be composed of an air permeable material configured to provide air passage between the distal side and the bearing facing side.

The sealing element 130 may be manufactured using a variety of materials including, but not limited to, felt, technical felt, felt wool felt, coarse gray wool felt, semi-coarse gray wool felt, felt fabric, synthetic nonwovens and/or other air permeable materials. Felt materials may include natural and/or synthetic fibers and/or furs pressed together using heat, moisture and/or pressure. Felt material may include natural wool blended with synthetic wool in order to create a durable, resilient felt for industrial use. In some implementations, the sealing element 130 may be manufactured using synthetic fibers. In one or more implementations, density of the material used for the sealing element 130 may be selected from the range between 300 kg/m$^3$ and 700 kg/m$^3$, inclusive, preferably 360 kg/m$^3$ in one implementation. In some implementations, the sealing element 130 may be impregnated with a lubricating fluid, such as machine oil, prior to installation.

The housings 102 of the assembly 100 may be manufactured using various engineering plastics that match the operating conditions of a particular bearing assembly (oil resistant, acid resistant, alkali resistant and/or other requirements). When selecting material for the plastic housing 102, the maximum operating temperature of the bearing assembly is taken into account.

Vertical and/or horizontal molding machines and/or injection molding machines may be used to manufacture bearing protection assembly of the present disclosure, e.g., such as assembly 100 shown and described with reference to FIG. 1A. In one embodiment, the material for the sealing element 130 (e.g., felt ring) may be placed in an injection mold during manufacture. Specially designed mold elements may be used to hold the sealing material in place to create a strong bond to the plastic housing. The use of molding can produce a solid cast and dimensionally stable element in service.

In some implementations, bearing assembly 100 of FIG. 1A may be manufactured by injection molding. Glass fiber filled engineering polymers can be used to make the housing 102. In some implementations copolymers can be used for manufacturing the housing 103. By way of a non-limiting illustration, such materials may include polyamide (PA) polymers (e.g., nylon, nylon resins) PA6, PA6.6, PA11, PA12, PA610, and/or others; acrylonitrile-butadiene-styrene (ABS), polycarbonate (PC), PC/ABS blends, polyoxymethylene (POM), and/or other plastics which may be characterized by high durability, heat resistance, and resistance to deformation.

The underlying properties of a given plastic material may be modified using additives to improve their handling and end use for the conveyor pulley bearing housing applications. These additives may be classified as follows: reinforcing fibers, fillers and binders; plasticizers; dyes; stabilizers (halogen stabilizers, antioxidants, ultraviolet absorbers and biological preservatives); processing aids (lubricants, others and flow control); fire retardants, peroxides; and antistatic agents, hydrophobic additives, and/or other additives.

Fiber-filled plastics (e.g., fiberglass) may be obtained using base plastics impregnated with short strands of fiberglass, thereby providing a material with high strength and durability that is much lighter than steel. Fiber-filled plastics may contain from 5 to 50% glass fibers by volume, preferably 30% in some embodiments.

Such modified materials may be configured to have sufficient mechanical strength, shock and vibration resistance. In accordance with this application, the selected material can be resistant to hydrocarbons (kerosene, benzene, etc.), mineral oils, concentrated and weak alkalis, weak acids. Bearing housing materials may include heat stabilizers. Heat stabilizers may be used for the manufacture of various structural elements and parts that are used in mechanical engineering and that operate under shock and vibration conditions. Parts manufactured in this way do not require additional mechanical adjustment and have several advantages:

- lighter and may significantly reduce the inertial mass of the rotating parts of the conveyor;
- installation in the pipe is carried out without machining the shell by means of pressing with proper tension so that the body remains inside the pipe without changing its position during continuous operation;
- when pressed into the pulley housing (the pipe), the housing cylindrical pipe that may not be perfectly circular may be straightened out, thereby producing aligned pulley assembly;
- the assembly does utilize or use embedded and/or built in components or pre-machined or built in features;
- the target integrity of the pulley assembly is achieved; and
- increased resistance to corrosion when compared to all metal designs.

Figure 2C:
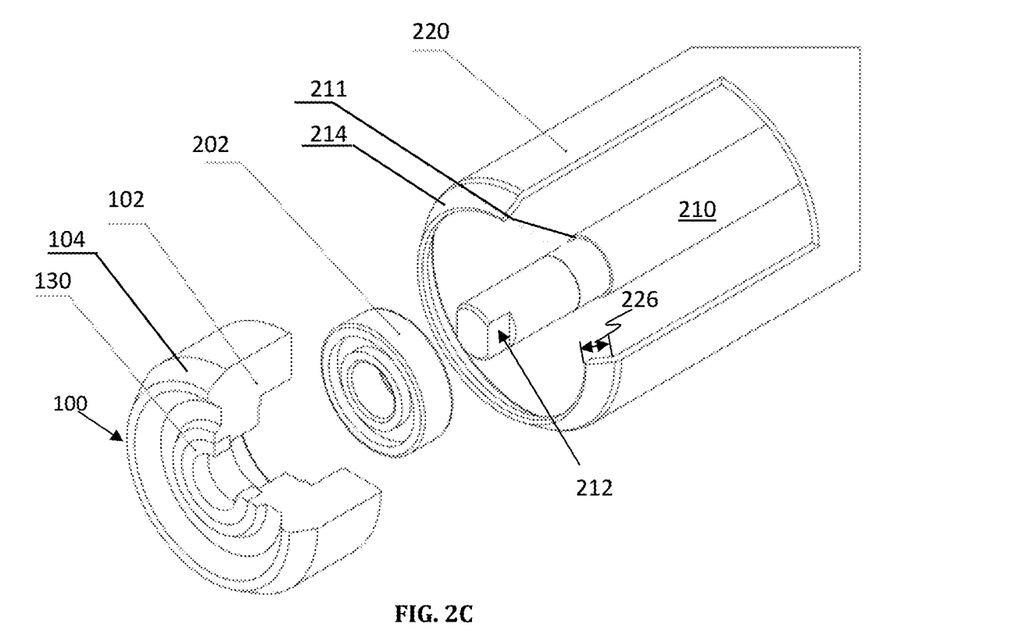
FIG. 2C is an exploded perspective view illustrating a portion of the pulley assembly of FIG. 2A.

FIGS. 2A-2D illustrate non-separable pulley apparatus including the bearing housing with integrated protection according to the present disclosure. FIG. 2A is an exploded perspective view illustrating pulley assembly 200 that may include a metal tubular pulley housing 220 (also referred as pulley shell), a pulley shaft (axle) 210 of a given diameter and length, two bearings 202, and two bearing housing assemblies 100 with integrated protection. Individual bearing housing assemblies may include plastic housing 102 and protective element 130, e.g., such as assemblies 100 described herein with respect to FIGS. 1A-1D. Individual bearings 202 may include metal radial bearing, e.g., rolling element bearings 204PP, 304PP, and/or other bearings typically used in conveyor pulley assemblies. FIG. 2C illustrates one side of the pulley 200 of FIG. 2A.

Pulley housing 220 may include a section of cylindrical pipe of a given length, thickness, and diameter. Pulleys of various sizes may be made manufactured using the bearing housing of the present disclosure, including, but not limited to, pulley diameters 76 mm (3"), 102 mm (4"), 127 mm (5"), 152 mm (6"), and/or other pulley dimensions. In some applications, the felt bearing housing of the present disclosure may be used with 89 mm (3.5"), 108 mm (4.25") and/or 133 mm (5.24 ") pulleys (rollers). It is noteworthy, that typically, pulley diameters are referred to using the outside diameter values for the pulley housing. Inside diameter of a given pulley may be obtained using the outside diameter less twice the thickness of the pulley housing. By way of an illustration, 76 mm (3") pulley housing may be manufactured using 14 gauge (about 2 mm) thickness pipe. Accordingly, internal diameter of such pulley may be about 72 mm. It will be appreciated by those skilled in the arts, that the values above are provided as an illustration, and various other pulley housing diameter and/or pulley housing thickness may be used.

The axle 210 may feature a shoulder 211 (on each side) configured to limit the extent of insertion of the bearing 202 inward into the pulley. Each end of the axle 210 may include a shaft key 212 to facilitate installation, assembly, and/or maintenance of the pulley. In some implementations, the shaft key 212 may include one or more flat facets forming, e.g., a triangular key, rectangular key, hex key and/or other key; one or more slots, threaded end, and/or other features configured to facilitate coupling of a keyed tool to the shaft.

Figure 2D:
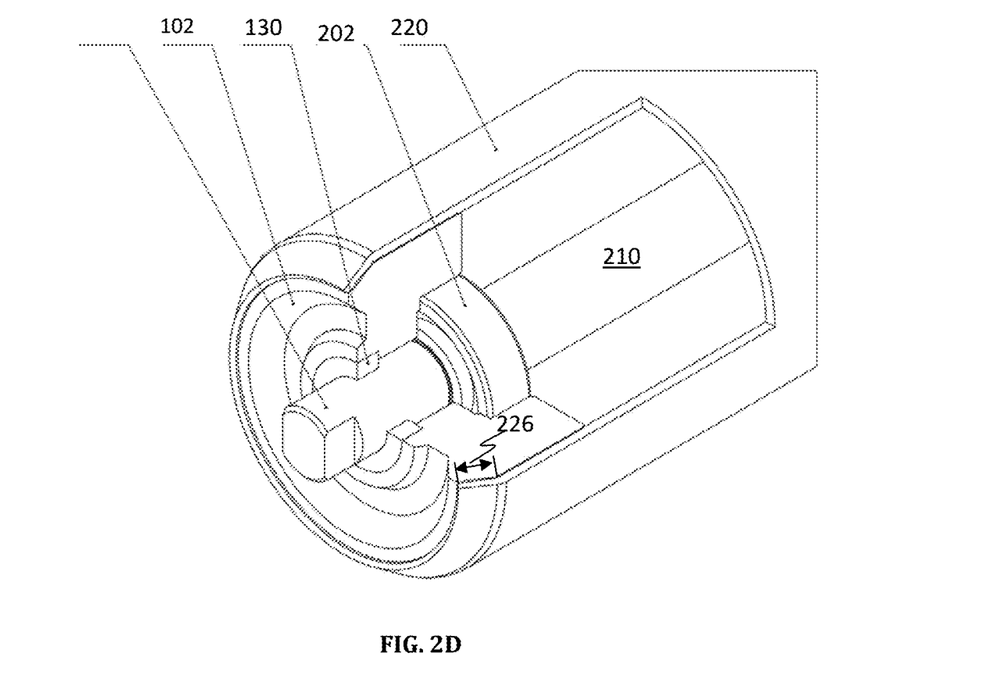
FIG. 2D is a perspective view illustrating one end of the pulley assembly of FIG. 2B.

FIGS. 2B and 2D illustrate assembled (collapsed) pulley of FIGS. 2A, 2C, illustrating mutual configuration of pulley housing 220, bearing housing assembly 100, shaft 210, metal bearing 202. As shown in FIG. 2B, bearing 202 is configured to fit within the bearing cavity (112 in FIGS. 1A-1D and FIG. 2A) of the housing 102. Sealing element (protection) 130 is disposed on the outward facing side of the bearing housing and the pulley thereby providing protection for the bearing 202.

During assembly of the pulley 200, the bearing 202 may be disposed into the cavity 112 of the bearing housing with the integrated protection (endcap) 100 via, e.g., a press fit operation, to obtain pulley endcap subassembly. The endcap subassembly (including the bearing housing with the integrated protection and the bearing) may be inserted onto the axle 210 and press-fitted into the pulley housing 220 until the inner race of the bearing 202 comes in contact with the axel shoulder 211. Tubes used for pulley housing may be characterized by a non-uniform wall thickness and/or non-uniform curvature (diameter).

In some applications, in order to ensure a robust press fit, the outside diameter of the bearing housing (e.g., 106 in FIG. 1B or FIG. 2C) may be made slightly larger (e.g., by an amount that may be selected from the range from 0.2 mm to 1 mm, inclusive, 0.4 mm in one implementation) than the nominal diameter of the pulley housing. During installation of the pulley endcap subassembly into the pulley housing, a portion of the bearing housing 102 may be "shaved off" by the inner edge of the pulley housing 220 thereby forming or "molding" the endcap to the specific internal profile of the pulley housing. The shaved off excess plastic may be easily removed. Similar operation may be performed for the other side of the pulley, wherein a second pulley subassembly may be installed into the pulley housing. In some implementations, installation of two pulley subassemblies may be performed contemporaneously with one another.

Upon insertion of the pulley subassemblies into the pulley housing, the housing pipe may be is rolled up or crimped. Pulley pipe end forming (also referred to as pipe end bending) may be performed using a variety of manufacturing methodologies, including, e.g., a lathe, a press, a stamping press, and or other methods. Pulley housing pipe end forming may produce a slanted portion of the pipe (also referred to as slanted chamfer, a ledge, an edge bevel) 214 that may provide structural support for the pulley endcap and prevent axial withdrawal of the pulley endcap from the pulley housing. During pipe end forming, the slanted bevel 114 of the bearing housing 102 may provide support for the forming of the slanted chamfer 214 so that the slanted chamfer 214 may be in contact with (may rest on) the bevel 114.

Dimension 226 of the ledge 214 may be configured based on the one or more parameters of the pulley, e.g., thickness of the pulley housing, material used for the pulley housing (e.g., steel stiffness), diameter of the pulley, thickness of the bearing housing) and or other parameters.

FIG. 2D illustrates an enlarged portion of the pulley assembly of FIG. 2B detailing pulley endcap configuration when installed inside the pulley housing. Use of the slanted chamfer 130 enables sufficient separation of the bearing protector 100 from the bearing 502 such to prevent rubbing of the protector element 100 against the retaining ring 503. After installation into the pulley housing, a portion of the endcap 200 (endcap flange 206) is visible.

The resulting pulley assembly may be characterized by a robust mechanical strength, where connections between individual components (e.g., pulley housing, pulley shaft, and pulley endcaps) are obtained without the need for machining the pulley body within the surface, using mechanical fasteners and/or other fastening parts. Accordingly, pulley manufacturing in accordance with the methodology of the present disclosure may utilize less costly and/or simpler operations (e.g., press fit) compared to, e.g., machining, and hence reduce pulley manufacturing costs. In some implementations, pulleys obtained using methodology of the present disclosure may be referred to as non-separable, and/or non-disassembleable, pulley with non-removable endcaps, and may be employed in applications where pulley disassembly, pulley repairs, and/or refitting may not be desired and/or possible. Pulleys obtained using methodology of the present disclosure may provide a lower cost solution compared to fully disassemblable designs, and may enable use of replacement pulleys in lieu of disassembly and/or repair. Some such applications may include airspace space exploration, military equipment, oil and gas exploration, mining (e.g., coal, ore), agriculture, construction, and/or other applications.

Methodology of the present disclosure provides improved protection of bearing assemblies from dust and abrasives and includes the use of felt as proximal means protection of bearing assembly, made in the manufacture of the bearing housing of the conveyor pulley from polymer composite materials by injection molding with embedded parts. As shown and described herein, an outward facing part of the bearing housing 100 includes felt protection 130, which is placed proximate the bearing so as to filter out particulates as the air passes from the outside to the inside of the pulley.

Prototypes of pulleys employing bearing protection assemblies obtained in accordance with the present disclosure demonstrated advantages over existing bearing protections. During tests, the prototype bearing protection of the present disclosure showed to reduce content of dust and other particulars inside a pulley, after operation in dusty environment. Reduction in dust penetration inside a bearing during pulley use, reduces bearing wear and may extend operation lifetime of the bearing and the pulley.

These phenomena may cause air to flow through the protective assembly (for example, outward from the bearing to the outside during operation; inwardly from the outside toward the bearing during cooling/shutdown). Even small volumes of air may introduce abrasive elements into the bearing.

By way of illustration, in coal mining applications, dust particles (also referred to as microparticles) ranging in size from 1 μm to 100 μm, inclusive, may remain suspended in the air for some time after the initial air disturbance has ceased. Such airborne microparticles may penetrate into unprotected bearings during air exchange between the outside and the inside volume of the pulley, thereby significantly reducing bearing life, causing pulley failure, and/or conveyor stoppages.

Bearing protection assemblies 100 with protective element 130 shown in FIG. 1A (for example, made of felt and/or other materials described herein) may be used with conveyor pulleys in order to provide greater protection for the bearings from dust, microparticles and/or other particles and/or corrosive compared to commonly used standard labyrinth seals, providing a reliable filter barrier and significantly reducing the transfer of a particular substance into the bearing, while still allowing air to pass through the protective element.

Bearing protection assemblies, e.g., such as the bearing assembly 100 with protection 130 of FIG. 1A, may be used with typical conveyor pulley and other bearing assemblies, allowing existing installations to be retrofitted to improve reliability. The use of the bearing protection according to the present disclosure may provide improve technological efficiency of bearing installation in most machinery rotary groups (e.g., conveyor pulleys), where other types of protection were previously used to increase the bearing life; reduce installation costs and/or equipment downtime. The load-bearing protective assemblies described herein may be characterized by a reduced complexity of manufacturing, reduced weight, extended operational life span, reduced maintenance requirements, and/or cost.

Where certain elements of these implementations can be partially or fully implemented using known components, only those portions of such known components that are necessary for an understanding of the present disclosure will be described, and detailed descriptions of other portions of such known components will be omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "plastic" is meant generally to denote all types of materials consisting of any of a wide range of synthetic or semi-synthetic organic compounds that are malleable and so can be molded into solid objects.

It will be recognized that while certain aspects of the technology are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

What is claimed:

1. A pulley apparatus for use in a belt conveyor, the apparatus including:
a pulley housing having a cylindrical portion characterized by a first inner diameter and having a first end and a second end opposing the first end;
an axle characterized by an axle diameter;
a first bearing assembly disposed onto the axle proximate the first end; and
a second bearing assembly disposed onto the axle proximate the second end;
wherein:
individual ones of the first bearing assembly and the second bearing assembly include:
a bearing housing characterized by an outer cylindrical surface and configured to receive a bearing, the bearing housing having a bevel disposed proximate an outward facing side and forming an angle with the outer cylindrical surface; and
the air-permeable sealing element disposed proximate the outward facing side of the bearing housing; an air-permeable sealing element configured to allow air passage between the outward facing side and an inward facing side of the housing;
the outer cylindrical surface is characterized by a first outer diameter configured no smaller than the first inner diameter so as to form a press fit between the pulley housing and individual ones of the bearing housing; and
the pulley housing is configured to form a first slanted chamfer and a second slanted chamfer proximate the first end and the second end, respectively; individual one of the first and the second slanted chamfers matching the first and second bevel of the bearing housing of the first and the second bearing assembly, respectively, individual ones of the slanted chamfers configured to retain the respective ones of the first and the second bearing assemblies within the pulley housing.

2. The apparatus of claim 1, wherein the bearing housing includes:
a plastic housing including a first cylindrical cavity proximate the bearing side, the first cylindrical cavity having a second inner diameter that is smaller than the first outer diameter; and
a second cylindrical cavity formed proximate the distal side.

3. The apparatus of claim 2, wherein: the plastic housing includes an engineering plastic material selected from the list consisting of polyamide polymer, Nylon, ultra-high molecular weight polyethylene, polycarbonate, acrylonitrile butadiene styrene (ABS), and polyoxymethylene.

4. The apparatus of claim 2, wherein the third inner diameter is configured in the range between 95% and 97%, inclusive, of the axle diameter.

5. The apparatus of claim 2, wherein the air permeable element includes an air-permeable ring disposed inside the second cylindrical cavity, the air-permeable ring characterized by a third inner diameter configured no greater than the axle diameter.

6. The apparatus of claim 5, wherein:
the air-permeable ring includes one or more of felt, synthetic fiber reinforced felt, and wool; and
the air-permeable material is impregnated with a lubricant configured to reduce friction between the axle and the air-permeable ring.

7. The apparatus of claim 5, wherein the air-permeable ring is configured to prevent passage of solid particles with particle sizes between 1 micrometer and 100 micrometer inclusive from the distal side to the bearing side.

8. The apparatus of claim 5, wherein:
the pulley housing is characterized by a first thickness; and
the first outer diameter configured not to exceed the first inner diameter by an amount configured between one half and one of the first thickness.

9. The apparatus of claim 8, wherein the first bearing assembly further includes:
a first bearing disposed coaxially within the first cylindrical cavity of the first bearing assembly bearing housing; and
a second bearing disposed coaxially within the first cylindrical cavity of the second bearing assembly bearing housing;
wherein: individual ones of the bearing housing of the first and the second bearing assemblies further include a shoulder portion disposed around the circumference of the respective first cylindrical cavity; the shoulder portion is configured to arrest axial insertion of respective one of the first bearing and the second bearing into the respective first inner cavity.

10. The apparatus of claim 9, wherein individual ones of the first bearing and the second bearing include a metal rolling bearing.

11. The apparatus of claim 10, wherein the first inner diameter is selected from the range between 72 mm and 152 mm, inclusive.

12. A housing for a bearing, the housing including:
a cylindrical body characterized by a first outer diameter, a bearing side and a distal side, the cylindrical body having an outer cylindrical surface, the cylindrical body forming:
a first cylindrical cavity proximate the bearing side, the first cylindrical cavity having a first inner diameter that is smaller than the first outer diameter;
a second cylindrical cavity formed proximate the distal side, the second cylindrical cavity having a second inner diameter that is smaller than the first inner diameter;
an air permeable ring disposed inside the second cylindrical cavity; and
a bevel disposed proximate the distal side and forming an angle with the outer cylindrical surface;
wherein: outer diameter of the an air permeable ring is configured equal the second inner diameter.

13. The housing of claim 12, wherein the air-permeable ring includes one or more of felt, synthetic fiber reinforced felt, and wool.

14. The housing of claim 13, wherein the air-permeable ring is configured to prevent passage of solid particles with particle sizes between 1 micrometer and 100 micrometer inclusive from the distal side to the bearing side.

15. The housing of claim 13, wherein the air-permeable material is impregnated with a lubricant configured to reduce friction between the axle and the first bearing protector.

16. The housing of claim 13, wherein the cylindrical body includes one or more of polyamide polymer, Nylon, ultra-high molecular weight polyethylene, polycarbonate, acrylonitrile butadiene styrene (ABS), and polyoxymethylene.

17. The housing of claim 13, further including a shoulder portion disposed around the circumference of the first cylindrical cavity.

18. The housing of claim 17, wherein:
the bearing is configured to be inserted axially into the first cylindrical cavity from the bearing side via a press-fit operation, the shoulder portion is configured to arrest axial insertion of the bearing into the first inner cavity; and
outer diameter of the bearing is configured to match the first inner diameter to form a slide-in fit.

19. The housing of claim 18, wherein:
the bearing includes a metal rolling-element bearing; and
the air-permeable ring forms an opening with a third inner diameter; and
the second inner diameter is configured to be at least 95% of the axle diameter.

20. The housing of claim 18, wherein: the angle is selected from the range between 30° and 60°, inclusive.

\* \* \* \* \*